(12) United States Patent
Keats

(10) Patent No.: US 8,978,300 B2
(45) Date of Patent: Mar. 17, 2015

(54) POST OR WALL MOUNTED STACKABLE PLANT POT

(76) Inventor: John Rodney Keats, Lambton (AU)

(*) Notice: Subject to any disclaimer, the term of this patent is extended or adjusted under 35 U.S.C. 154(b) by 735 days.

(21) Appl. No.: 13/002,248

(22) PCT Filed: Jul. 1, 2009

(86) PCT No.: PCT/AU2009/000847
§ 371 (c)(1),
(2), (4) Date: Dec. 30, 2010

(87) PCT Pub. No.: WO2010/083549
PCT Pub. Date: Jul. 29, 2010

(65) Prior Publication Data
US 2011/0219687 A1    Sep. 15, 2011

(30) Foreign Application Priority Data
Jul. 1, 2008    (AU) ................................ 2008903367

(51) Int. Cl.
*A01G 9/02*        (2006.01)

(52) U.S. Cl.
CPC ....................................... *A01G 9/023* (2013.01)
USPC .............................................................. 47/83

(58) Field of Classification Search
CPC ......... A01G 25/00; A01G 27/02; A01G 9/02; A01G 9/022; A01G 9/023
USPC ................. 47/39, 65.6, 66.1, 82, 83
See application file for complete search history.

(56) References Cited

U.S. PATENT DOCUMENTS

| | | | |
|---|---|---|---|
| 284,090 A * | 8/1883 | Tingle | 211/75 |
| 3,018,898 A * | 1/1962 | Frazelle | 211/107 |
| 4,355,485 A | 10/1982 | Frank | |
| 5,251,399 A * | 10/1993 | Rasmussen | 47/39 |
| 5,265,376 A * | 11/1993 | Less | 47/83 |
| 5,502,922 A | 4/1996 | Shlomo | |
| D466,763 S * | 12/2002 | Wu | D7/637 |
| 7,040,053 B1 * | 5/2006 | Beesley | 47/39 |
| 2008/0236040 A1 * | 10/2008 | Sheaffer et al. | 47/65.6 |
| 2009/0000189 A1 * | 1/2009 | Black | 47/82 |
| 2011/0219687 A1 * | 9/2011 | Keats | 47/65.6 |

FOREIGN PATENT DOCUMENTS

| | | | | |
|---|---|---|---|---|
| DE | 2 540 038 A1 | 3/1977 | | |
| FR | 2918537 A1 * | 1/2009 | ............... | A01G 9/02 |
| GB | 2 029 197 A | 3/1980 | | |
| GB | 2 139 086 A | 11/1984 | | |
| GB | 2 351 225 A | 12/2000 | | |
| JP | 54104021 A * | 8/1979 | ........................ | 47/82 |

OTHER PUBLICATIONS

International Search Report: PCT/AU2009/000847.

* cited by examiner

*Primary Examiner* — Monica Williams
(74) *Attorney, Agent, or Firm* — Zareefa B. Flener; Flener IP Law

(57) ABSTRACT

A plant pot adapted to be stacked geometrically within a lateral 180° radial array with one or more other similar plant pots in tiered alignment offset one level to the next. A back wall (1) of the pot is adapted to be received and interlock with an multi-channelled elongated supporting stem (9) and connector (28B) which are adapted to fastened to any vertical or near vertical surface. The stem (9) has a centrally located hollow channel (22) to receive the connector (28B) located partially within its top and/or bottom portions to connect two or more stems (9) allowing a continuance of plant pots supported in a stacked formation.

21 Claims, 15 Drawing Sheets

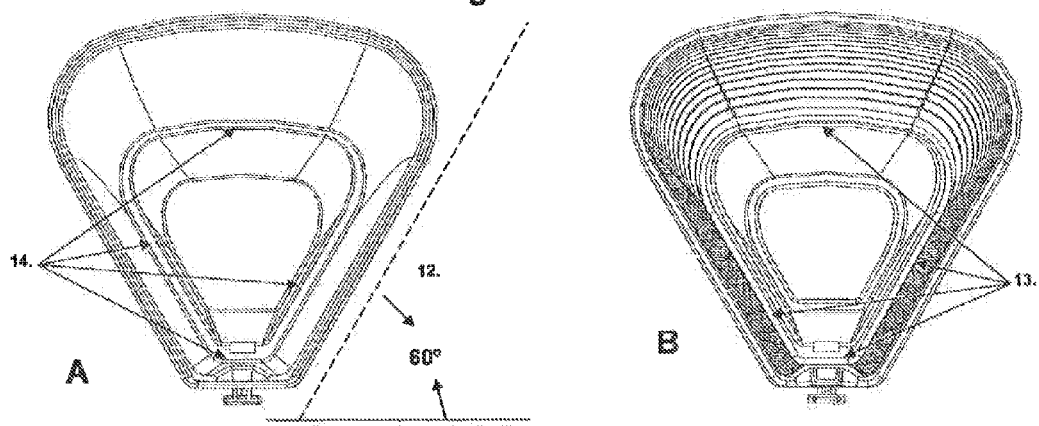
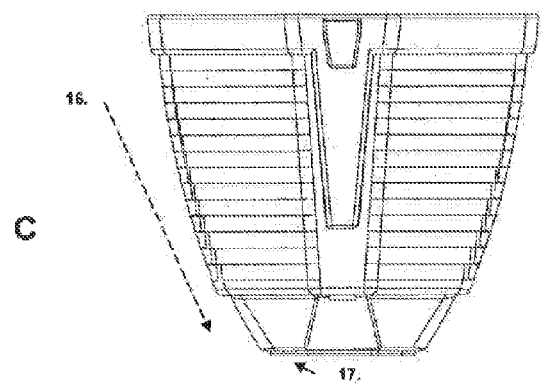
Fig. 2

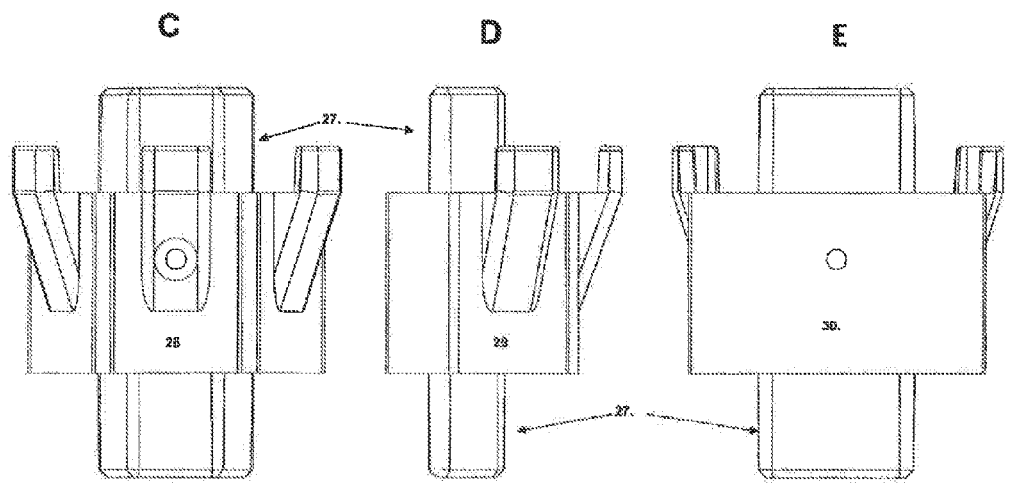
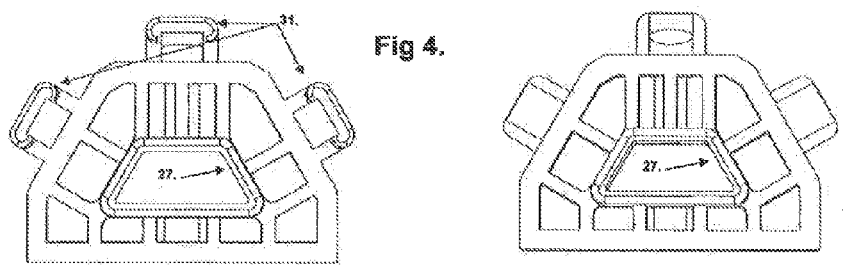
Fig 4.

POST OR WALL MOUNTED STACKABLE PLANT POT

TECHNICAL FIELD

The present invention relates to a Stackable Plant Pot and in particular a fluid retaining stackable plant pot adapted to attach securely to a post or wall mounted supporting device and stack in a lateral 180° radial aligned manner one level above the other on the offset.

BACKGROUND OF THE INVENTION

Various forms of wall mountable plant pots are known for growing plants. Typically these known forms of wall mountable plant pots are either half cylindrical, half frustoconical or rectangular prism forms that are singularly mounted none of which are in fact stackable.

There have also been attempts in the past to attach multiple plant pots on to a supporting device to produce a plurality of growing surfaces however these plant pots are generally not stackable or stacked in a lateral 180° radial aligned manner on the offset enhancing the visual impact of a growing display of plants, nor fluid retaining and are generally individually attached to the supporting device.

They are simply arranged directly above or below other adjacent individually attached plant pots shading the lower positioned plant pots at certain times of any day and typically not suitable for various sun loving plant varieties.

There are also various stackable plant pots on the market but all are not intended to be post or wall mounted nor do they have that ability.

They are designed to be stacked geometrically one above the other on the offset encompassing a full 360° radial array of growing areas and not a 180° radial array necessary for post or wall mounted plant pots in a stacked offset formation.

Many plant enthusiasts like to arrange their plants on a wall parallel in a vertical, diagonal or horizontal relationship for a particular aesthetic appeal and the saving of space.

Such an arrangement typically depends on the use of several wall mounted plant pots with single horizontal growing areas consuming considerable wall space and requiring substantial moisture maintenance.

As a consequence many walls may become permanently marked or damaged by continual contact with moisture intended to be retained within the wall mounted plant pot or safely drained away.

In the context of this specification the term "wall mountable" means able to be mounted or attached to any vertical surface.

The term "Fluid Retaining" means the ability to retain fluids primarily water and or soluble nutrients or special growing solutions and store said fluids to be later released into the growing medium by its own capillary action as and when required for an extended period of time.

The term "growing medium" means soil, potting mixture, compost etc

The term "supporting structure means" any surface that the supporting device will be fastened to e.g. (wall, Post, Rail, Fence) etc.

OBJECT OF INVENTION

The object of the present invention is to provide a plant pot which, in use, is adapted to be stacked geometrically within a lateral 180° radial array in direct communication with one or more other similar plant pot/s in a tiered alignment offset one level to the next greatly increasing structural strength and aesthetics.

This will enable the user to position the stacked formation directly against a wall or upon a post with all growing areas benefiting from the same light source and the entire intended stacked formation aligned and interconnecting with a securely fastened purposefully adapted supporting device that can interconnect with an identical supporting device providing a continuance of stacked formations.

The invention is also intended to provide plant pots that are stackable and mountable in this manner with each plant pot retaining fluids in self contained fluid retaining reservoirs so as these fluids may be drawn upon by the soils own capillary action when needed.

It is also intended that the drainage overflow from said fluid retaining reservoirs be directed away from the supporting device and the wall or post that it is fastened to so as to avoid unsightly water damage or staining to these structures with these excess fluids guided into the growing area of a plant pot positioned in the stacked formation directly below.

SUMMARY OF INVENTION

According to this invention there is provided a plant pot adapted to be mounted onto a wall or post and to be stacked geometrically within a lateral 180° radial array with one or more other similar plant pots, wherein: each said plant pot has a back wall, side walls and a front wall extending between a base portion and an upper rim portion defining the pot cavity.

According to this invention there is provided a plant pot and further includes an elongated supporting mountable stem and connecting device.

Said back wall portion of plant pot is adapted to be received and interlock with the elongated supporting mountable stem which is adapted to fasten to any vertical or near vertical surface in co-operation with appropriate fastening devices and support an intended stacked formation of said plant pots in tiered alignment offset one level to the next.

A series of stacked formations may be joined by interconnecting the elongated supporting mountable stems and connecting devices.

The connecting devices offer further support to the stacked formation by being independently fastened to a supporting structure e.g. (Wall or Post)

The invention also provides a plant pot which in use, is fluid retaining adapted with fluid retaining reservoirs with directional drainage overflow capabilities.

In addition according to this invention there is provided a plant pot that further includes a grid like panel.

The fluid retaining reservoirs are separated from the growing media by this grid like panel that is adapted with perforated cup shaped deformations that seat on the reservoir floor.

These prevent growing media entering the fluid retaining reservoir however does allow fluid to be drawn out of the fluid retaining reservoir by the soils own capillary action Accordingly the invention is a combination of one or more pot embodiments, one elongated supporting mountable stem embodiment, one connecting device embodiment and one or more grid like panel embodiments all of which may be assembled and interconnected to an identical assembly and so on providing a continued stacked formation.

Preferred Plant Pot Embodiment:

The preferred embodiment of the plant pot is adapted to be stacked geometrically within a lateral 180° radial array with one or more similar plant pots, wherein: each said plant pot has a stepped back wall two stepped side walls and a stepped lobed front wall extending between a base portion and an upper thickened rim portion defining the pot cavity.

Said back wall extends an external vertically descending T shaped solid profile adapted to be received and interlock within a corresponding vertically descending hollowed T shaped profile formed within an elongated multi-channelled mountable stem, Furthermore the said back wall of said plant pot is vertically and inwardly stepped at an angle to form a strengthened spine with two sides and a base partially extending down the back wall portion.

The base of said spine is recessed and forms a partially hollowed overhang.

It is also preferred that the pot side walls project outward off the back portion wall. And it is intended that the right side wall projects outward at 60° and mirrored projection of the left side wall, both side walls intersect with the lobed front portion, the back portion, the base portion and the upper thickened rim.

It is further preferred that the back wall portion, the side wall portions and the lobed front wall portion are stepped inwardly forming an external overhang and an internal ledge at a predetermined distance above the base portion.

The said internal ledge and connecting walls and base portion laterally define a fluid retaining reservoir region in the lower section of the cavity.

Preferably both side portion walls of said plant pot embodiment, and the lobed front portion wall are tapered toward the base portion edge to allow the external overhang formed in the side wall portions to align and rest securely upon the upper rim portion/s of said plant pot or plant pots positioned immediately below on the offset when in a stacked and mounted formation establishing greater structural support.

Preferably the pot is moulded from polypropylene COPP plastic.

The preferred embodiment has an opening that extends through the back wall and a portion of the rear internal ledge and external overhang immediately below the location of the resting grid like device in its assembled position.

This opening is narrow enough to discharge drainage overflow however allowing the fluid retaining reservoir to store the maximum amount of useable fluids.

It is further preferred that the portion of the back wall immediately below the top edge of said drainage overflow opening is tapered toward the front portion of the plant pot encouraging all drainage overflow to be directed away from the supporting stem and wall and to spill into the central growing area of a plant pot positioned below in the stacked formation.

Preferred Embodiment of the Elongated Supporting Mountable Stem:

The elongated multi-channelled supporting mountable stem has a preferred embodiment that has a trapezoidal profile with at least three vertically descending T shaped hollowed channels opening outward adapted to receive and interlock correspondingly with the external T shaped vertically descending solid profile located on the external upper back portion of said plant pot or plant pots intersecting at right angles upon the front and side faces of the elongated trapezoidal mountable supporting stem.

It is further preferred that the elongated multi-channelled supporting mountable stem is further adapted with a centrally located hollow channel to receive a connecting device located partially within its top or bottom portions to connect two or more elongated multi-channelled supporting mountable stems together thus allowing a continuance of a plurality of said plant pots supported in a stacked formation.

Preferably the back surface or trapezoidal shaped elongated multi-channelled supporting mountable stem has a series of ribs descending vertically along its entire length, the purpose of which is to hold the back surface of the stem embodiment slightly off the supporting structure, to provide air circulation and prevent mildew development between the stem embodiment and the supporting structure.

The supporting stem will have one or more holes passing through the stem laterally with central alignment for the purpose of accepting a fastening device and final attachment to the supporting structure.

It is preferred that the supporting stem and connector are made from hardened plastic Preferred Embodiment of the Connector:

The preferred embodiment of said connector and is also trapezoidal with a profile consistent with the trapezoidal profile of the multi-channelled supporting mountable stem.

It is also preferred that the connector has upper and lower centrally located hollowed trapezoidal protrusions that are adapted to correspond and be received by a preferred trapezoidal centrally located hollow channel within the multi-channelled supporting mountable stem.

Preferably the said connector has front, back and side walls and is further adapted with one or more hook like structures positioned on the front and side surfaces, these hook like structures or what is referred to in this specification as supporting fingers, align with and insert to form a snug fit within the recessed hollowed overhang of the spine formation on the back portion of said plant pot/s giving stability and further support to said plant pots when assembled into the stacked formation.

Preferably the connector has also a centrally aligned hole that passes through it laterally in a similar fashion to that of the stem for necessary pot support purposes.

The connector is the main load barring component of the invention and must be fastened to the supporting structure with a suitable fastening device.

Preferred Embodiment of the Grid Device:

It is preferred the said plant pot includes a fitted grid like device that seats securely upon the internal ledge of the pot and extends across that plain defined by the back, side and front inner walls completely covering the retaining reservoir region The grid like device acts as a barrier preventing the growing medium entering the fluid retaining reservoir however allowing excess drainage of fluid to enter the enclosed fluid reservoir region via narrow openings extending through the horizontally seated wall of the grid.

It is further preferred that said grid like device has a series of cup shaped formations extending down from the upper surface of the grid and resting on the internal floor of the fluid reservoir region.

The lower side walls and base of these cup shaped formations have narrow openings extending through the walls to allow fluid to be transported and drawn back up into the growing media via the growing media's own capillary action.

BRIEF DESCRIPTION OF THE DRAWINGS

In order that the present invention may be more clearly understood, preferred embodiments will be described with reference to the following figures.

FIG. 2. View of Plant Pot, (Top (A), Bottom (B) and Back (C))

FIG. 4. View of Connector (Top (A), Bottom (B), Front (C), Back (E), and Side (D))

PREFERRED PLANT POT EMBODIMENT

Figure 1:
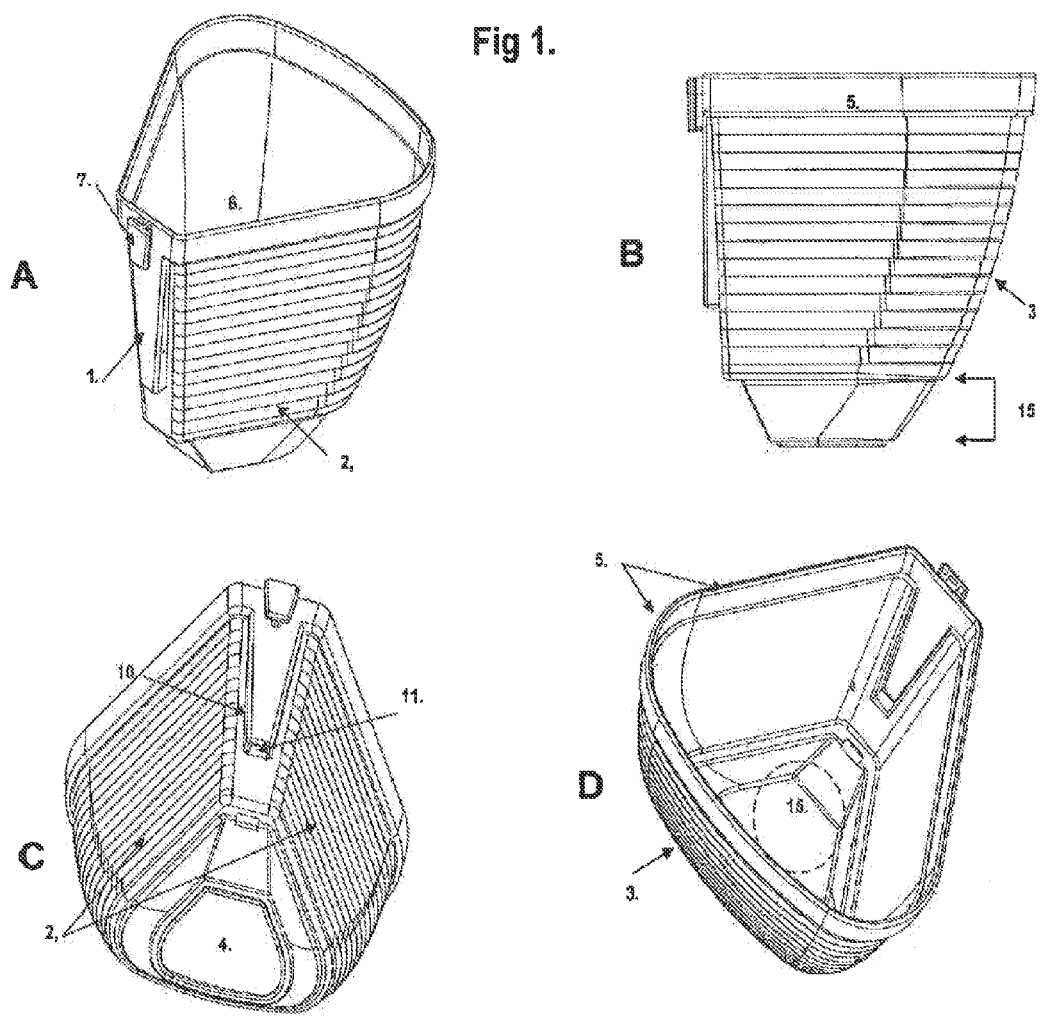
FIG. 1. View of Plant Pot, (Side View (B), Isometric Top (D), and Back Top (A) and Back Bottom (C))
Figure 10:
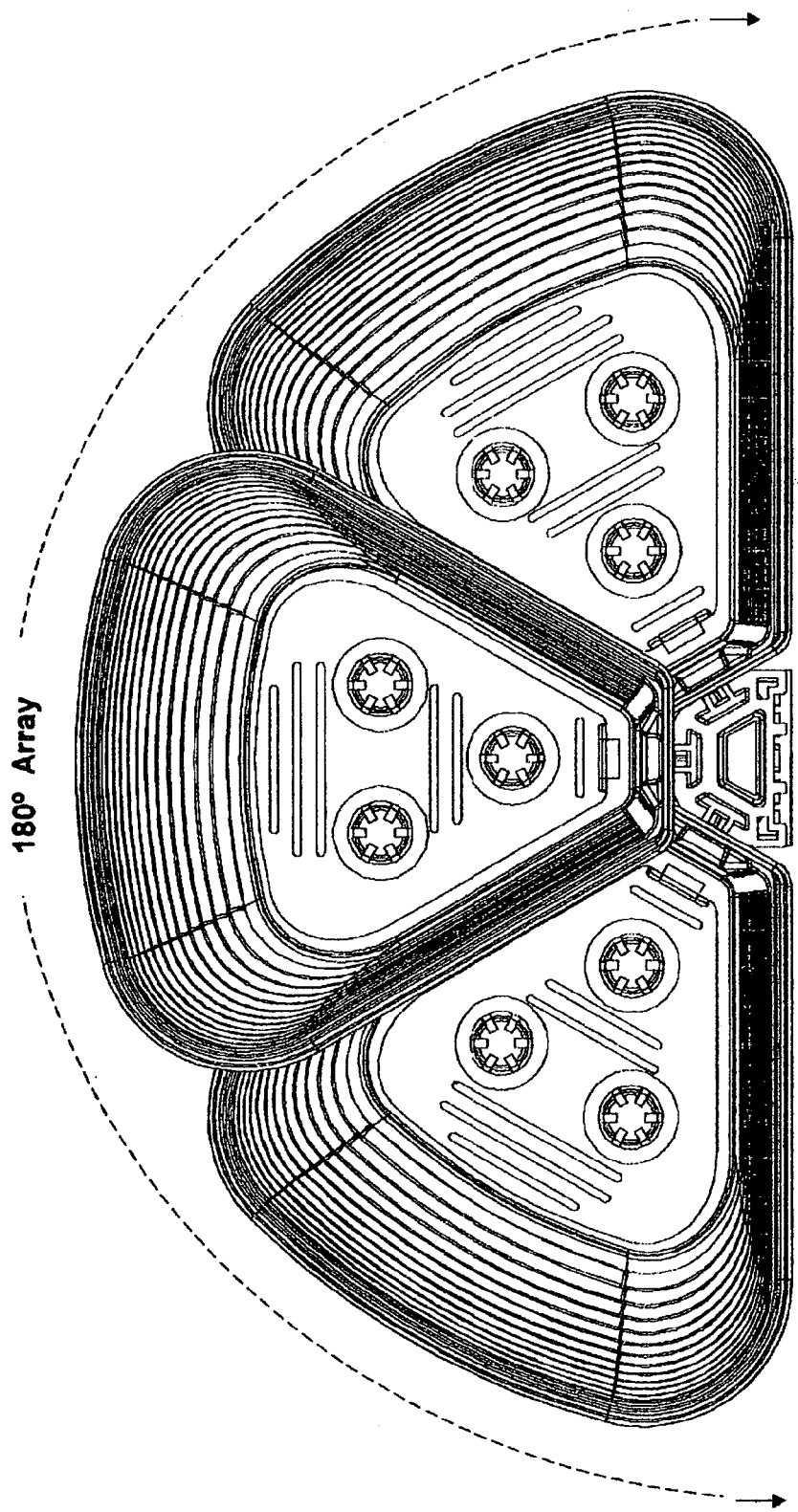
FIG. 10. View Assembly Top (180° array)

The preferred embodiment of the plant pot FIG. 1 is adapted to be stacked geometrically within a lateral 180° radial array FIG. 10 with one or more other similar plant pots, wherein: each said plant pot has a stepped back wall FIG. 1 (1) two stepped side walls FIG. 1 (2) and a stepped lobed front wall FIG. 1 (3) extending between a base portion FIG. 1 (4) and an upper thickened rim portion FIG. 1 (5) defining the pot cavity. FIG. 1 (6).

Said back wall FIG. 1 A (1) extends an external vertically descending T shaped solid profile FIG. 1 (7) adapted to be received and interlock within a corresponding vertically descending hollowed T shaped profile FIG. 8A (8) formed within an elongated multi-channelled mountable supporting stem, FIG. 8B (9)

Furthermore the said back wall of said plant pot is vertically and inwardly stepped at an angle to form a strengthened spine FIG. 1C (10) with two sides and a base partially extending down the back wall.

The base of said spine is recessed and forms a partially hollowed overhang. FIG. 1C (11)

It is also preferred that the pot side walls project outward off the back portion wall as shown in FIG. 2A. (12). And it is intended that the right side wall projects outward at 60° and mirrored projection of the left side wall, both side walls intersect with the lobed front portion, the back portion, the base portion and the upper thickened rim.

It is further preferred that the back wall portion FIG. 1A (1), the side wall portions FIG. 1 (2) and the lobed front wall portion FIG. 1 (3) are stepped inwardly forming an external overhang FIG. 2B (13) and an internal ledge FIG. 2A (14) at a predetermined distance above the base portion FIG. 1C (4).

The said internal ledge FIG. 2A (14) and connecting walls and base portion laterally define a fluid retaining reservoir region FIG. 1B and D. (15) in the lower section of the cavity.

Figure 11:
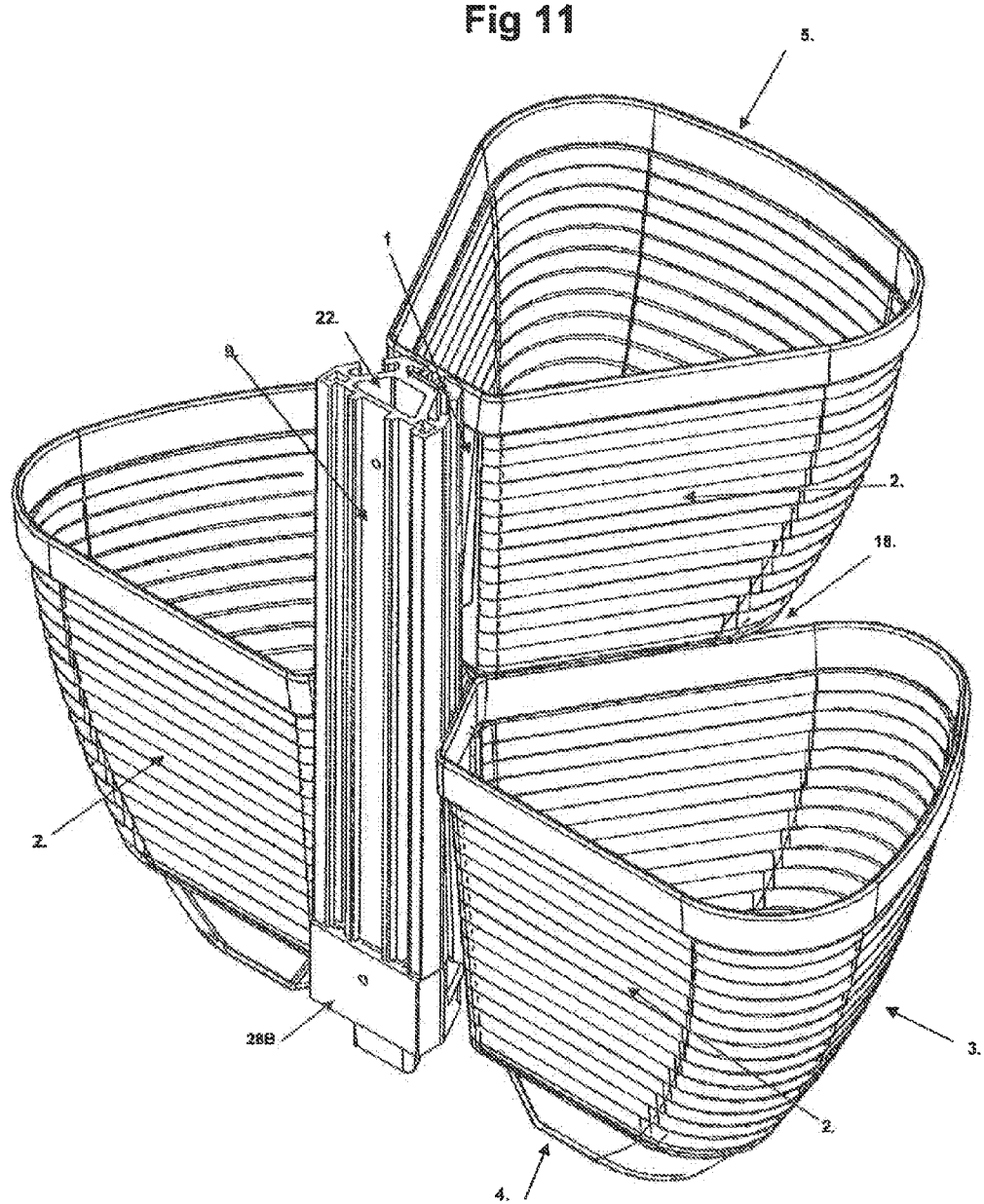
FIG. 11. View Assembly Back (Isometric View)

Preferably both side portion walls FIG. 1 (2) of said plant pot embodiment, and the lobed front portion wall FIG. 1 (3) are tapered FIG. 2C (16) toward the base portion lower edge FIG. 2C (17) to allow the external overhang FIG. 2B (13) formed in the side wall portions to align and rest securely upon the upper rim portion/s of said plant pot or plant pots positioned immediately below on the offset when in a stacked and mounted formation as shown in FIG. 11. (18) establishing greater structural support.

Preferably the pot is moulded from polypropylene COPP plastic

The preferred embodiment has an opening that extends through the back wall and a portion of the rear internal ledge and external overhang immediately below the location of the resting grid like device in its assembled position. FIG. 1D (19)

This opening is narrow enough to discharge drainage overflow however allowing the fluid retaining reservoir to store the maximum amount of useable fluids.

It is further preferred that the portion of the back wall immediately below the top edge of said drainage overflow opening FIG. 1 (20) is tapered toward the front portion of the plant pot encouraging all drainage overflow to be directed away from the supporting stem and wall and to spill into the central growing area of a plant pot positioned below in the stacked formation.

Preferred Embodiment of the Elongated Supporting Mountable Stem:

The elongated multi-channelled supporting mountable stem FIG. 8B (9) has a preferred embodiment that has a trapezoidal profile with at least three vertically descending T shaped hollowed channels FIG. 8A (8) opening outward adapted to receive and interlock correspondingly with the external T shaped vertically descending solid profile FIG. 1 (7) located on the external upper back portion of said plant pot or plant pots intersecting at right angles upon the front and side faces FIG. 10 (21) of the elongated trapezoidal mountable stem.

Figure 8:
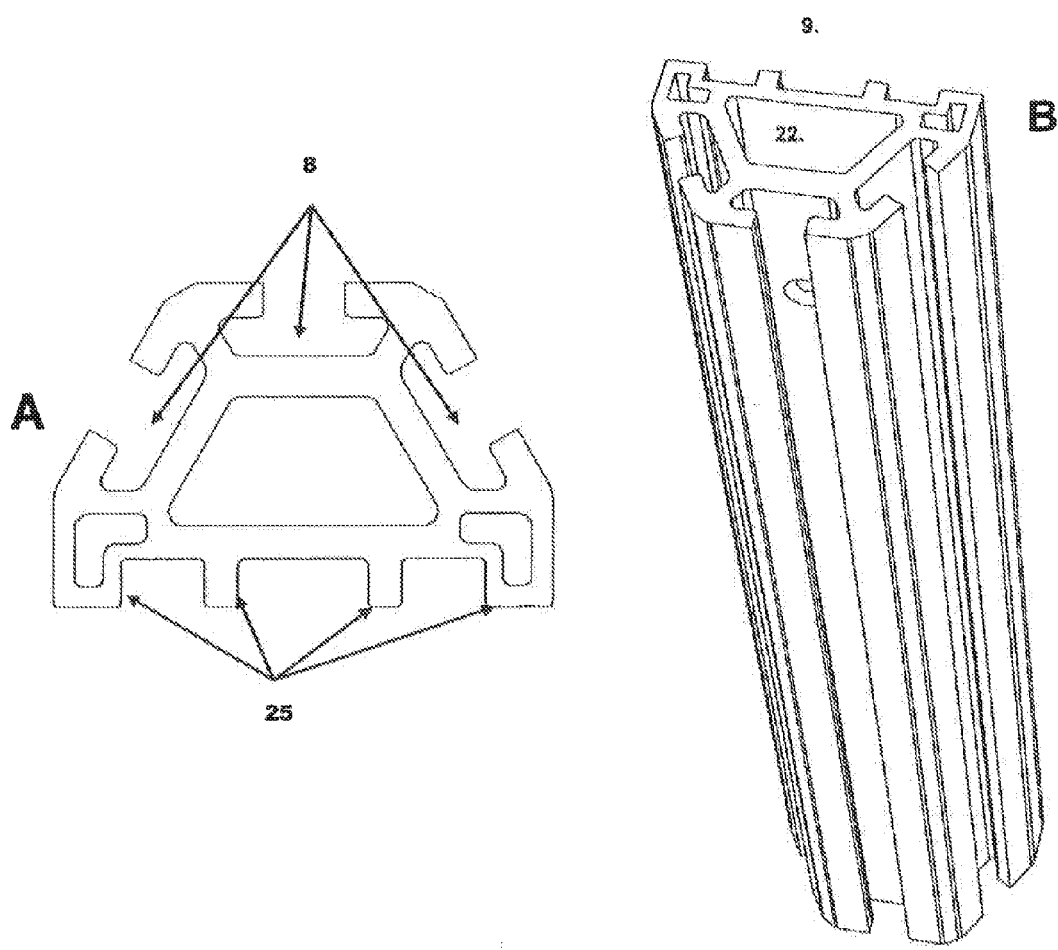
FIG. 8. View of Supporting Stem (Top, Bottom (A) and Isometric (B))
Figure 12:
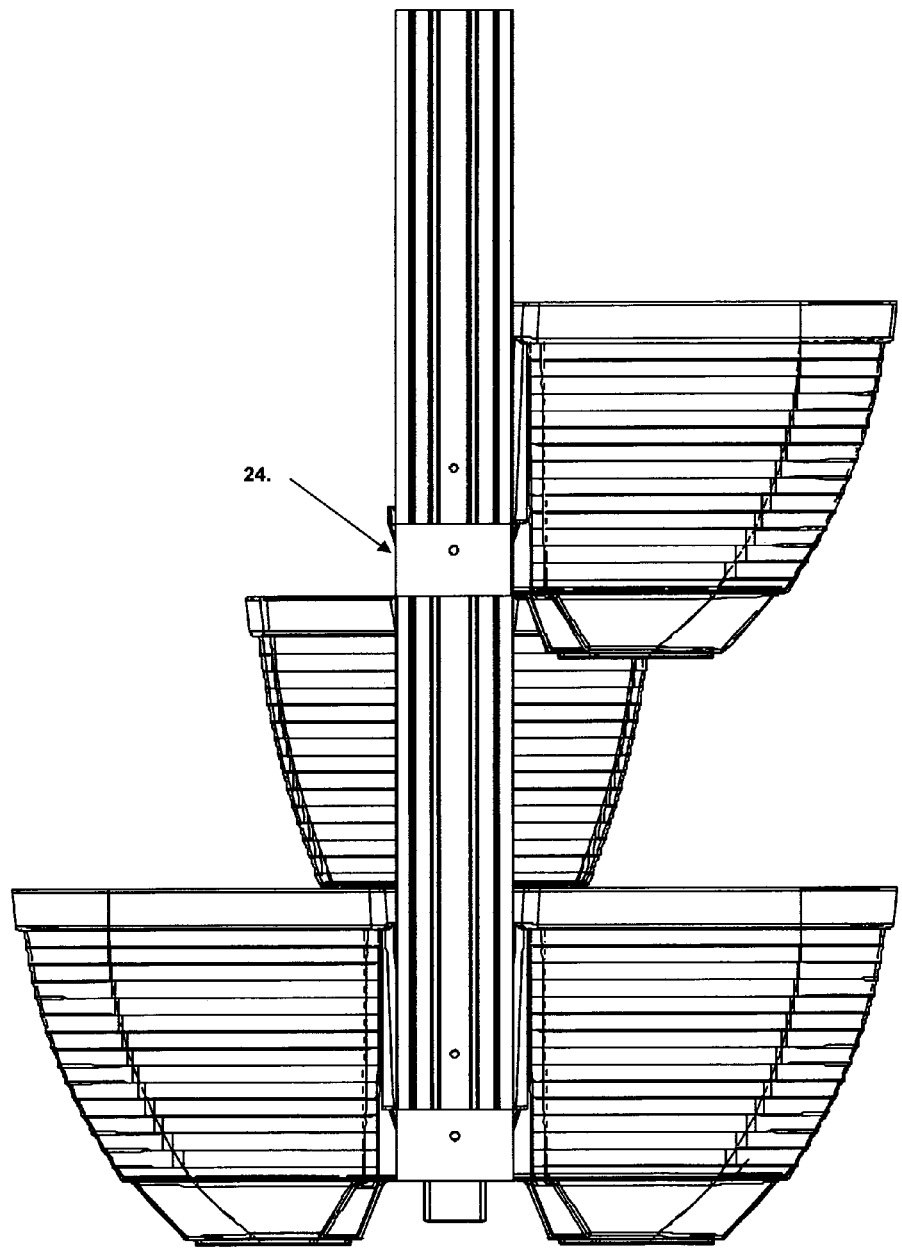
FIG. 12. View Two Assemblies Connected (Back)

It is further preferred that the elongated multi-channelled supporting mountable stem is further adapted with a centrally located hollow channel FIG. 8 (22) to receive a connecting device FIG. 4 located partially within its top or bottom portions FIG. 11 (23) to connect two or more elongated multi-channelled supporting mountable stems together FIG. 12. (24) thus allowing a continuance of a plurality of said plant pots supported in a stacked formation.

Preferably the back surface or trapezoidal shaped elongated multi-channelled supporting mountable stem has four ribs FIG. 8 A (25) descending vertically along its entire length, the purpose of which is to hold the back surface of the stem embodiment slightly off the supporting structure, to provide air circulation and prevent mildew development between the stem embodiment and supporting structure.

Figure 9:
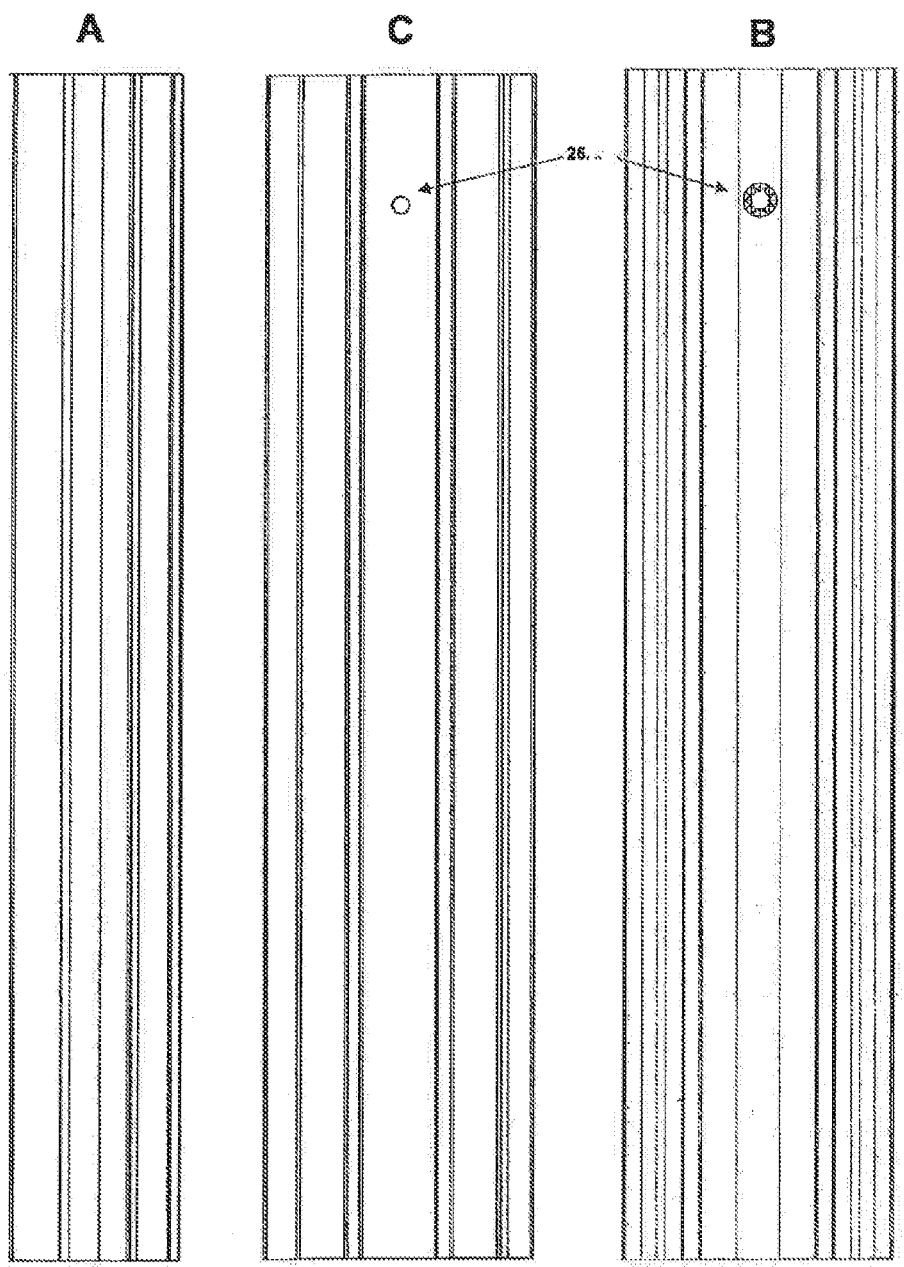
FIG. 9. View of Supporting Stem (Side (A), Front (C) and Back (B))

The supporting stem FIG. 8B (9) will have one or more holes FIG. 9. (26) passing through the stem laterally with central alignment for the purpose of accepting a suitable fastening device and final attachment to the supporting structure.

Figure 5:
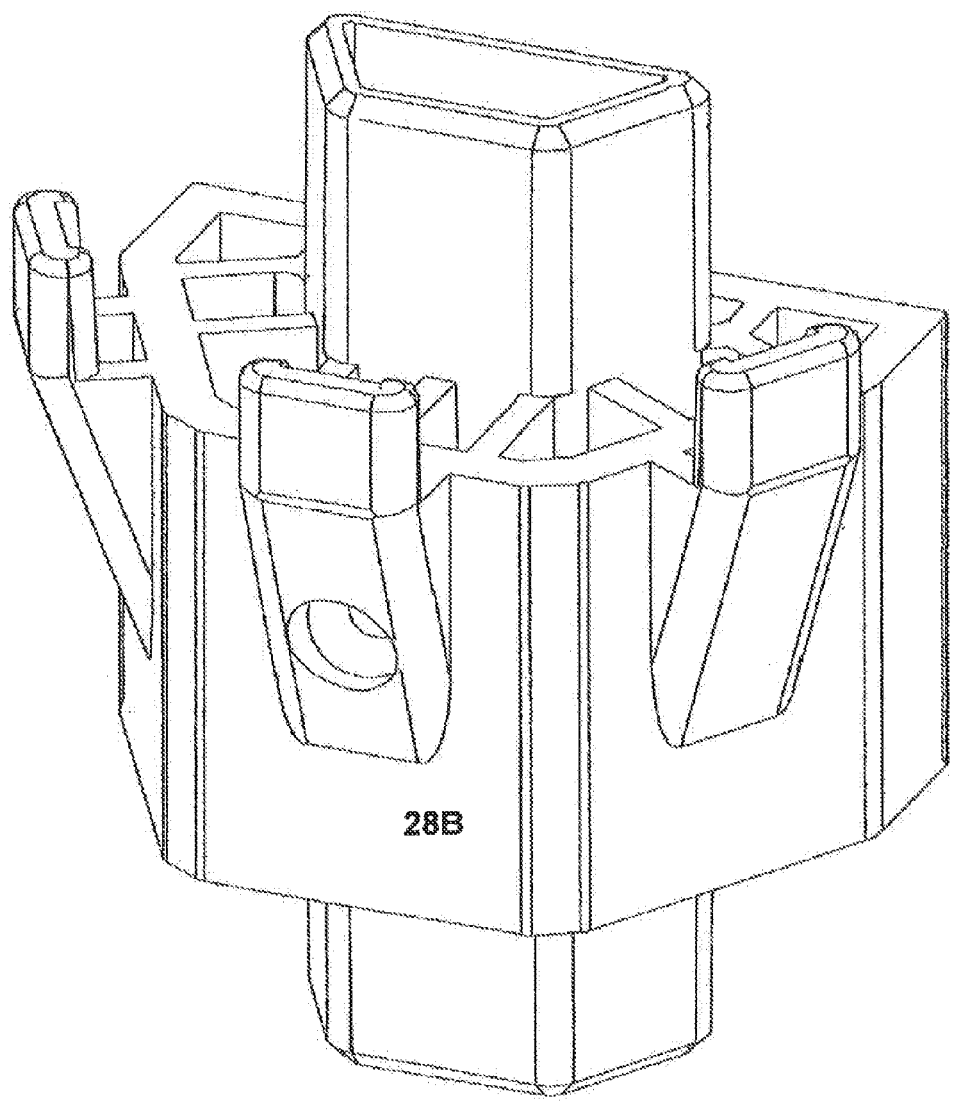
FIG. 5. View of Connector (Front Isometric)
Figure 6:
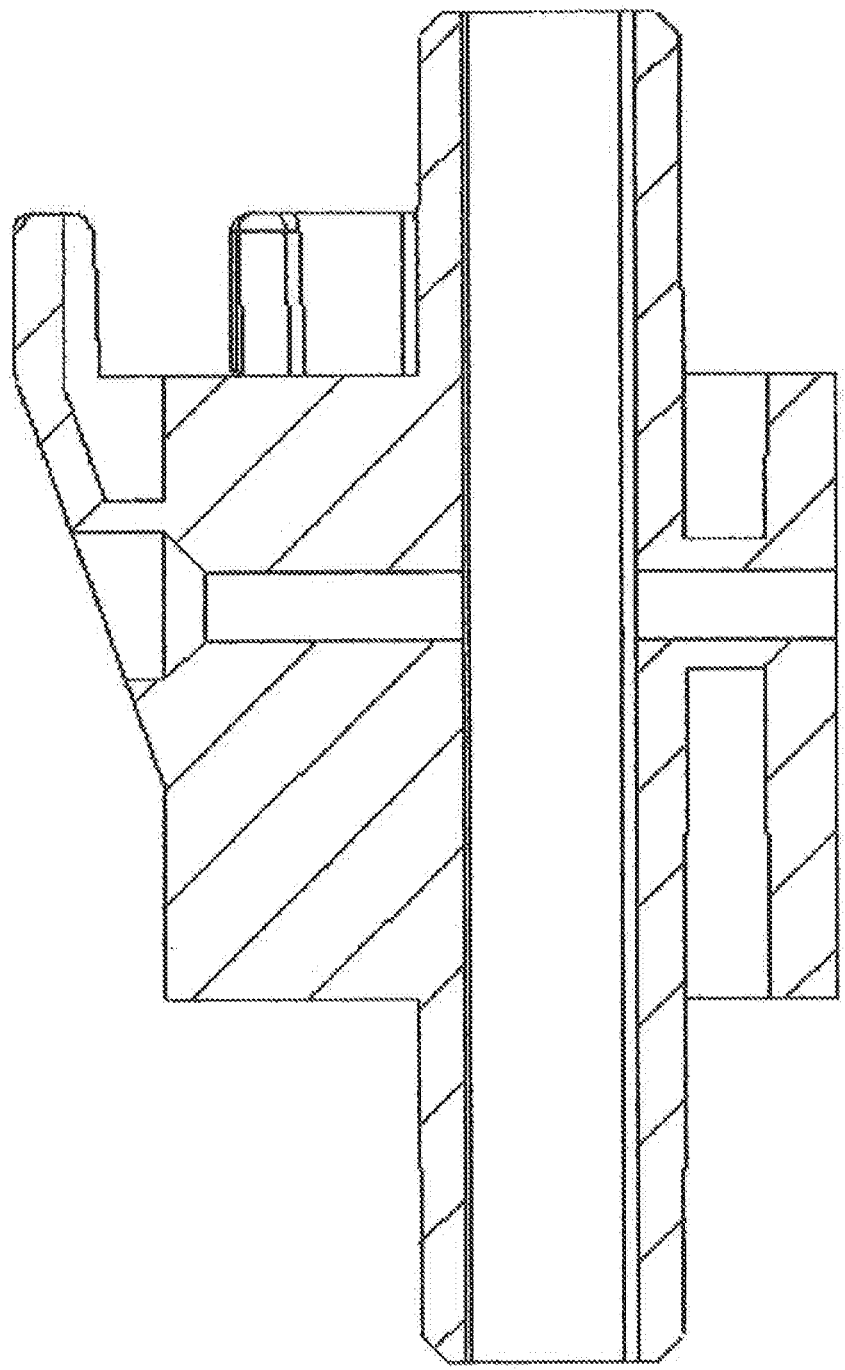
FIG. 6. View of Connector (Cross-Sectional)
Figure 7:
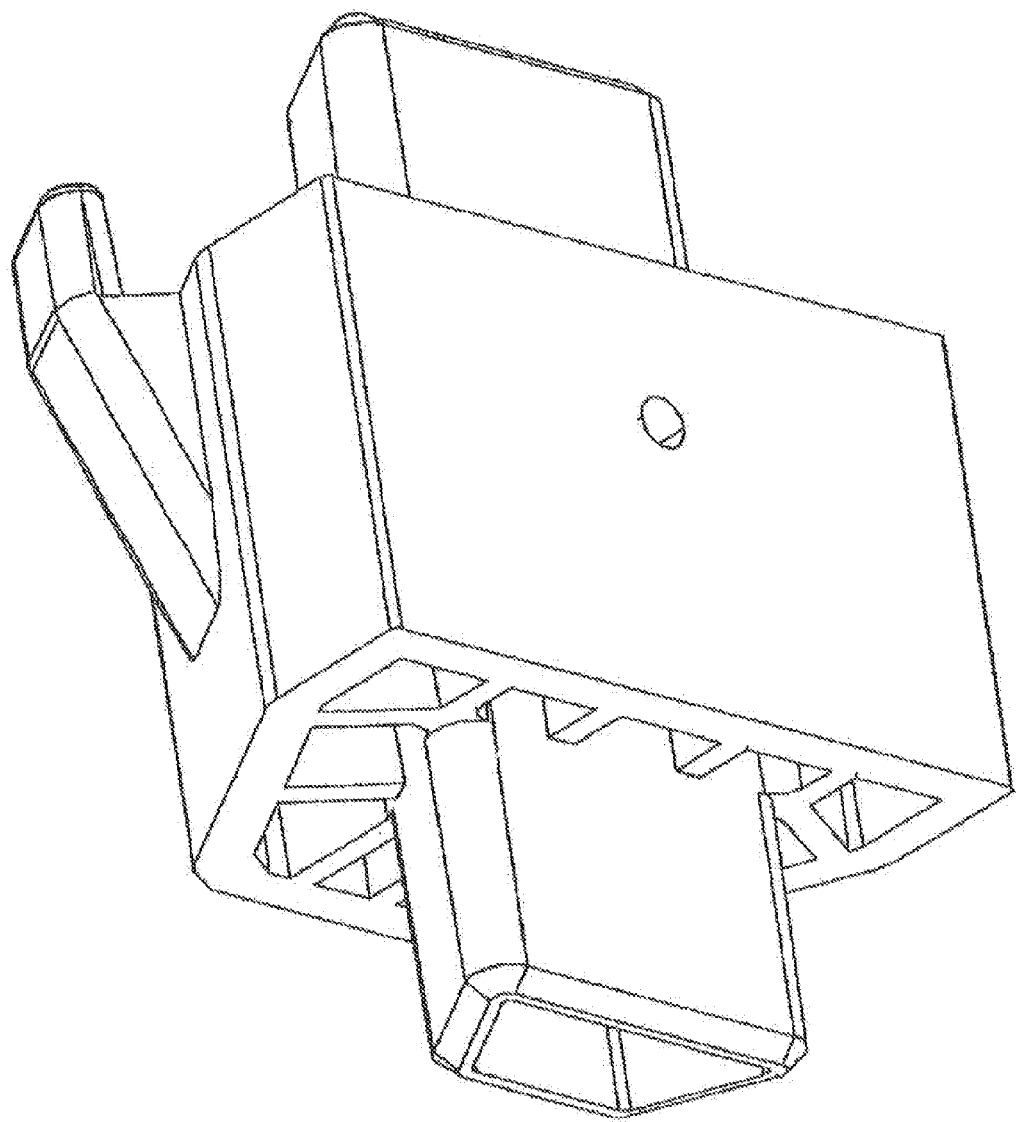
FIG. 7. View of Connector (Isometric Back)

It is preferred that the supporting stem FIG. 8B (9) and connector FIG. 4 are made from hardened plastic Preferred Embodiment of the Connector:

The preferred embodiment of said connector FIG. 5 (28B) and is also trapezoidal with a profile consistent with the trapezoidal profile of the multi-channelled supporting mountable stem. FIG. 8B (9)

It is also preferred that the connector has upper and lower centrally located hollowed trapezoidal protrusions FIG. 4 (27) that are adapted to correspond and be received by a preferred trapezoidal centrally located hollow channel FIG. 8 (22) within the multi-channelled supporting mountable stem. FIG. 8B (9)

Figure 13:
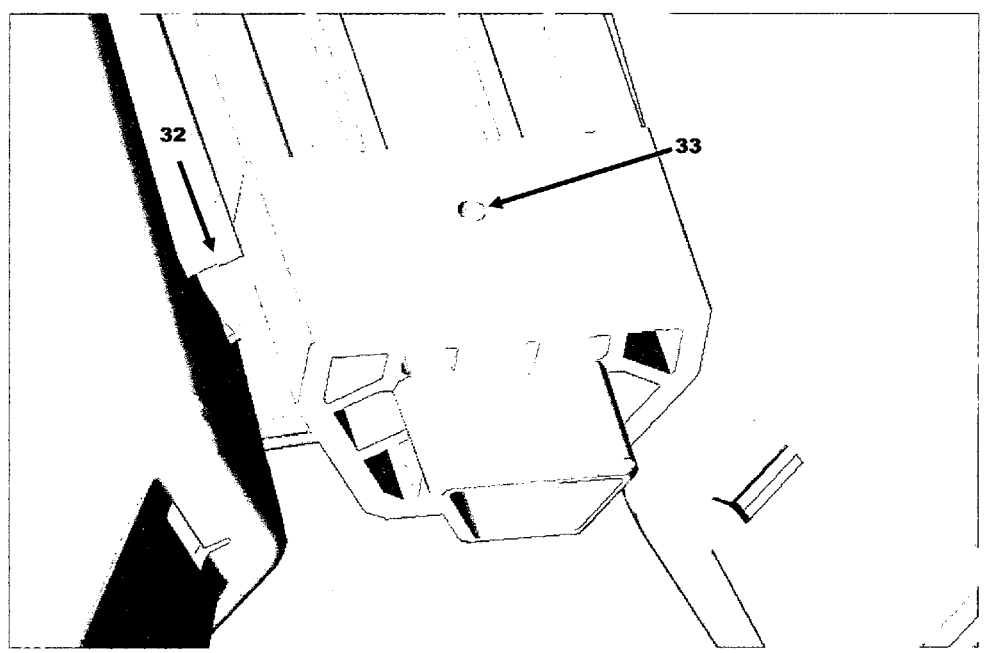
FIG. 13. View Assembly (Cad Illustration Connector to Pot)
Figure 14:
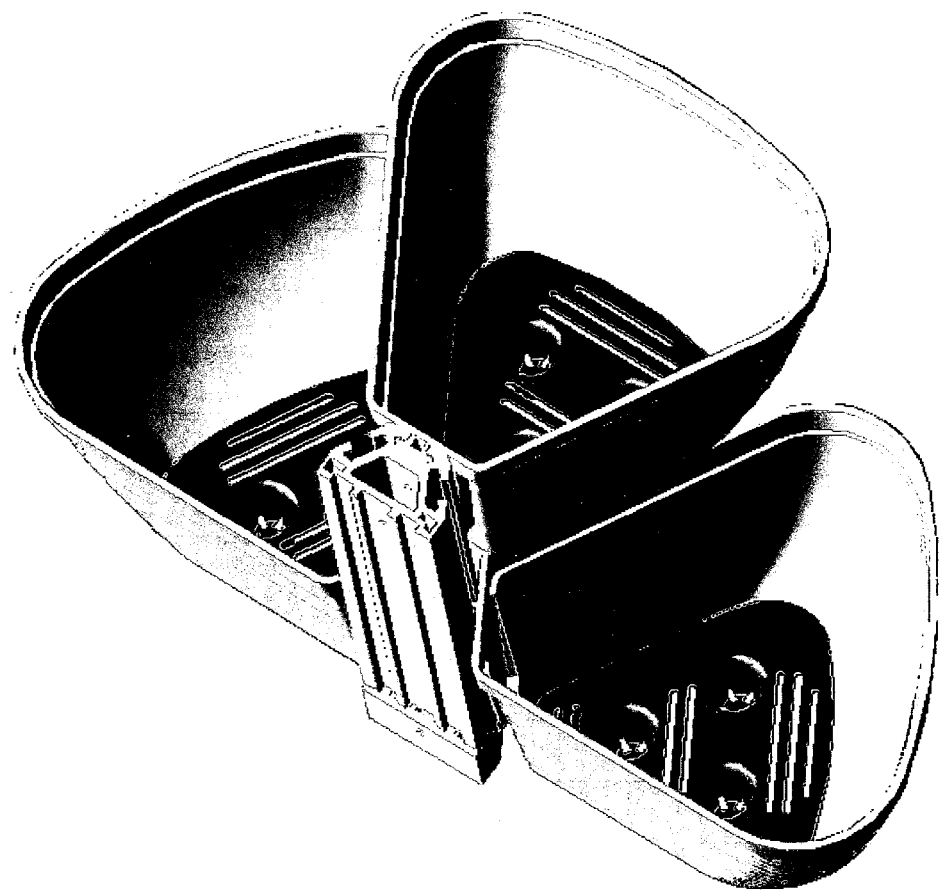
FIG. 14. View Assembly (Cad Illustration Front)
Figure 15:
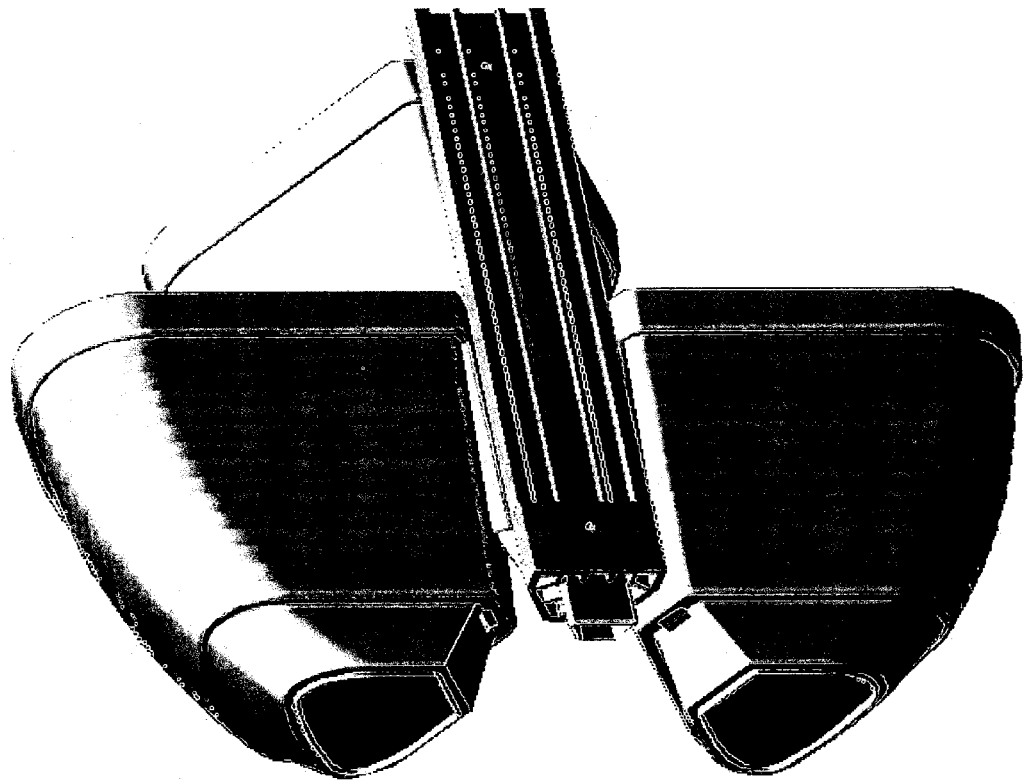
FIG. 15. View Assembly (Cad Illustration Back)

Preferably the said connector has front, FIG. 4 (28) back FIG. 4 (29) and side walls FIG. 4 (30) and is further adapted with one or more hook like structures positioned on the front and side surfaces FIG. 4 (31), these hook like structures or what is referred to in this specification as supporting fingers that align with and insert to form a snug fit within the recessed hollowed overhang of the spine formation on the back portion of said plant pot/s giving stability and further support to said plant pots when assembled into the stacked formation represented in a Cad illustration FIG. 13 (32)

Preferably the connector has also a centrally aligned hole FIG. 13 (33) pass through it laterally it in a similar fashion to that of the stem FIG. 8B (9) for necessary pot support purposes.

The connector is the main load barring component of the invention and must be fastened to the supporting structure with a suitable fastening device.

Figure 3:
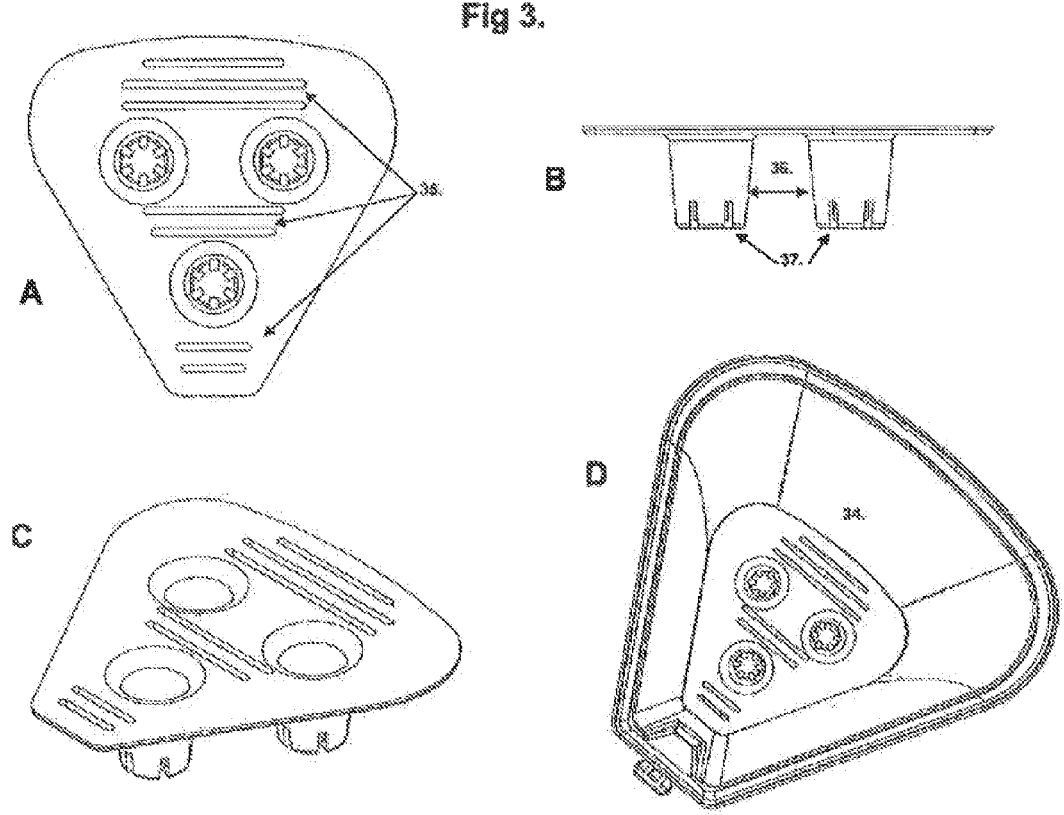
FIG. 3. View of Grid (Top (A), Side (B), Isometric (C) and fitted to Pot (D)

Preferred Embodiment of the Grid Device:

It is preferred the said plant pot includes a fitted grid like device FIG. 3 (34) that seats securely upon the internal ledge of the pot FIG. 2A (14) and extends across that plain defined by the back, side and front inner walls completely covering the retaining reservoir region FIG. 1. (15) The grid like device FIG. 3 acts as a barrier preventing the growing medium entering the fluid retaining reservoir FIG. 1. (15) however allowing excess drainage of fluid to enter the enclosed fluid reservoir region via narrow openings FIG. 3A (35) extending through the horizontally seated wall of the grid.

It is further preferred that said grid like device has a series of cup shaped formations FIG. 3B (36) extending down from the upper surface of the grid and resting on the internal floor of the fluid reservoir region. FIG. 1 (15)

The lower side walls and base of these cup shaped formations have narrow openings FIG. 3B (37) extending through the walls to allow fluid to be transported and drawn back up into the growing media via the growing media's own capillary action.

The claims defining the invention are as follows:

1. A plant pot assembly comprising one or more similar plant pots which are configured to be stacked geometrically within a lateral 180° radial array with the one or more other similar plant pots, each plant pot comprising:
    a back wall, side walls and a front wall extending between a base portion and an upper rim portion defining the pot cavity; and
    an elongated multi-channelled supporting mountable stem wherein said back wall is configured to be received and interlock with the elongated multi-channelled supporting mountable stem which is configured to fasten to any vertical or near vertical surface in co-operation with appropriate fastening devices and support an intended stacked formation of said plant pots in tiered alignment offset one level to the next.

2. The plant pot assembly according to claim 1, wherein each back wall, side wall and front wall comprises a stepped back wall two stepped side walls and a stepped lobed front wall extending between the base portion and an upper thickened rim portion defining the pot cavity; and wherein said back wall extends an external vertically descending solid profile configured to be received by and interlock within a corresponding vertically descending hollowed profile formed within the elongated multi-channelled supporting mountable stem.

3. A plant pot assembly according to claim 2, wherein the pot side walls project outwardly relative to the back wall, such that an interior angle defined by a pot side wall and the back wall are obtuse angles, and a right side wall projects outward and is a mirrored projection of a left side wall, and the right and left side walls intersect with the lobed front wall, the back wall, the base portion and the upper thickened rim portion.

4. The plant pot assembly according to claim 2, wherein portions of the back wall, the side walls, and the lobed front wall are stepped inwardly forming an external overhang and an internal ledge at a predetermined distance above the base portion and wherein the internal ledge and connecting walls and base portion laterally define a fluid retaining reservoir region in a lower section of the cavity.

5. The plant pot assembly according to claim 4, wherein portions of the side walls and portions of the lobed front wall are tapered toward the base portion edge to allow the external overhang formed in the side walls to align and rest securely upon the upper rim portion/s of said plant pot or plant pots positioned immediately below on the offset when in a stacked and mounted formation establishing greater structural support.

6. The plant pot assembly according to claim 4, wherein said fluid retaining reservoir is fitted with a super absorbent fluid retaining mat and said base portion of plant pot is configured with narrow outlets extending through the wall of the base portion to timely release excess drainage.

7. The plant pot assembly according to claim 4, wherein said plant pot further includes a fitted grid like device that seats securely upon the internal ledge and extends across a plane defined by the back, side and front walls completely covering the fluid retaining reservoir region, wherein the grid like device acts as a barrier preventing a growing medium entering the fluid retaining reservoir while allowing excess drainage of fluid to enter the enclosed fluid reservoir region via narrow openings extending through a wall of the grid.

8. The plant pot assembly according to claim 7, wherein said grid like device has a series of cup shaped formations extending down from an upper surface of the grid and resting on an internal floor of the fluid reservoir region and wherein lower side walls and a base of said cup shaped formations have narrow openings extending through the walls to allow fluid to be transported and drawn back up into the growing media via a capillary action of the growing media.

9. The plant pot assembly according to claim 7, wherein a drainage overflow opening extends through the back wall and a portion of the internal ledge and external overhang immediately below the grid like device and wherein the drainage overflow opening is narrow enough to discharge drainage overflow while allowing the fluid retaining reservoir to store the maximum amount of useable fluids.

10. The plant pot assembly according to claim 9, wherein a portion of the back wall immediately below the top edge of said drainage overflow opening is tapered toward a front portion of the plant pot encouraging all drainage overflow to be directed away from the supporting stem and wall and to spill into the central growing area of a plant pot positioned below in the stacked formation.

11. The plant pot assembly according to claim 7, wherein said stacked formation of plant pots, grids, elongated multi-channelled supporting mountable stem/s and connector/s may be supported in a vertical manner away from and not fastened to a vertical or near vertical surface and become free standing with the aid of an anchored rod, pipe, tube, cable, chain or rope passing through the trapezoidal centrally located hollow channel within the multi-channelled supporting mountable stem and the trapezoidal centrally located hollow channel within the connector/s.

12. The plant pot assembly according to claim 1, wherein the elongated multi-channelled supporting mountable stem has a trapezoidal profile with at least three vertically descending T shaped hollowed channels opening outward configured to receive and interlock correspondingly with an external T shaped vertically descending solid profile located on an external upper back portion of said plant pot or plant pots intersecting at right angles upon the front and side faces of the elongated trapezoidal mountable stem.

13. The plant pot assembly according to claim 12, further comprising a connector that is also trapezoidal with a profile consistent with the trapezoidal profile of the multi-channelled supporting mountable stem.

14. The plant pot assembly according to claim 13, wherein the connector has front, back and side walls and is further configured with one or more hook like structures positioned on the front and side surfaces, these hook like structures align with and insert within the recessed hollowed overhang of the spine formation on the back portion of said plant pot/s giving stability and further support to said plant pots when assembled into the stacked formation.

15. The plant pot assembly according to claim 6, wherein the connector is also trapezoidal with a profile consistent with the trapezoidal profile of the multi-channelled supporting mountable stem and the connector has upper and lower centrally located hollowed trapezoidal protrusions that are adapted configured to correspond and be received by a preferred trapezoidal centrally located hollow channel within the multi-channelled supporting mountable stem.

16. The plant pot assembly according to claim 1 wherein the elongated multi-channelled supporting mountable stem is further configured with a centrally located hollow channel to receive a connecting device located partially within its top and/or bottom portions to connect two or more elongated multi-channelled supporting mountable stems together thus allowing a continuance of a plurality of said plant pots supported in a stacked formation.

17. The plant pot assembly according to claim 1, wherein the back wall of said plant pot is vertically and inwardly stepped at an angle to form a strengthened spine with two sides and a base partially extending down the back wall and wherein the base of said spine is recessed and forms a partially hollowed overhang.

18. The plant pot assembly according to claim 1, wherein the pot side walls project outwardly relative to the back wall, such that an interior angle defined by a pot side wall and the back wall are obtuse angles.

19. The plant pot assembly according to claim 1, wherein the elongated multi-channelled mountable stem has a profile of any shape other than trapezoidal and has a plurality of vertically descending hollowed channels of any profile and correspondingly the connector with a plurality of supporting fingers.

20. The plant pot assembly according to claim 1, wherein an external vertically descending solid profile extending from the back wall of said plant pot and configured to be received and interlock within a corresponding vertically descending hollowed profile formed within an elongated multi-channelled mountable stem may be of any shape other than T shaped.

21. The plant pot assembly according to claim 1, wherein the side walls of said plant pot project outward off a back portion wall at angles other than 60° for a right side and mirrored for a left side with and both side walls intersecting a lobed front portion, a back portion, a base portion and an upper thickened rim.

* * * * *